United States Patent
Tsunekawa et al.

[11] 3,842,424
[45] Oct. 15, 1974

[54] EXPOSURE CONTROL DEVICE IN SINGLE-LENS REFLEX CAMERA

[75] Inventors: Tokuichi Tsunekawa, Yokohama; Soichi Nakamoto; Goro Hasegawa, both of Tokyo, all of Japan

[73] Assignee: Canon Kabushiki Kaisha, Tokyo, Japan

[22] Filed: Apr. 11, 1973

[21] Appl. No.: 350,195

[30] Foreign Application Priority Data
Apr. 20, 1972 Japan.............................. 47-39753

[52] U.S. Cl...................... 354/31, 354/51, 354/152
[51] Int. Cl. ............................................. G03b 7/08
[58] Field of Search ............... 95/10 CT, 10 PO, 42; 354/31, 51, 60, 23, 152

[56] References Cited
UNITED STATES PATENTS
3,429,246   2/1969   Eberty ................................ 95/10 X
3,612,703   10/1971  Irisawa et al........................ 95/10 X
3,710,699   1/1973   Mitani..................................... 95/10

Primary Examiner—Samuel S. Matthews
Assistant Examiner—Michael L. Gellner
Attorney, Agent, or Firm—Flynn & Frishauf

[57] ABSTRACT

This invention relates to an exposure control device for automatically controlling the shutter speed in a camera, especially a single-lens reflex camera. It utilizes the reset time characteristic of a light receiving element such as photoconductive cell or the like having a slow response characteristic to control the camera shutter to a high shutter speed, and utilizes light reflected from the surface of a film to control the shutter to an intermediate or a lower shutter speed.

14 Claims, 5 Drawing Figures

PATENTED OCT 15 1974 3,842,424

EXPOSURE CONTROL DEVICE IN SINGLE-LENS REFLEX CAMERA

BACKGROUND OF THE INVENTION

1. Field of the Invention

This invention relates to an exposure control device in a single-lens reflex camera, and more particularly to such an exposure control device having a light receiving element disposed so as to receive light reflected from the sensitive surface of a film.

2. Description of the Prior Art

There are known exposure control devices of the type in which light reflected from the sensitive surface of a film disposed within a camera is received by a light receiving element to control the exposure value. Where such a metering system is employed as that in a single-lens reflex camera, the film-reflected light passed to the light receiving element is provided by the light passed through the aperture device of the camera when stopped down and therefore, the quantity of the light received by the photoelectric converter element such as Cds or Se cell employed as the light receiving element is too small to be used for the metering purpose.

For example, in case of a known electronic shutter which employs a light receiving element as the time constant element for the adjustment of the shutter speed, the light receiving element must have a very quick response characteristic corresponding to the high shutter speed at which the shutter is opened and closed. The reason is that where the shutter is a focal plane shutter, the light reflected from the surface of a film is passed to the light receiving element only after the forward curtain of the shutter has been opened to expose the film, so that any light receiving element of slow response characteristic is not sufficient to quickly measure the time during which the rearward curtain of the shutter is closed. Such a disadvantage might to overcome by using a light receiving element of quick response characteristic, whereas such element is difficult to obtain. Therefore, the prior art has resorted to coloring the shutter curtain so as to provide it with about the same degree of reflection factor as that of the sensitive film surface and utilizing the reflected light from such colored shutter curtain to effect high shutter speed control. This method, however, could not ensure any accurate shutter speed control unless compensation was someway made for the difference in reflection factor between the shutter curtain and the film surface whose reflection factor is variable with the type of the film. If any treatment is applied to equalize the reflection factors of the shutter curtain and the film surface, it might result in the formation of flare or the like which is deleterious to photography.

SUMMARY OF THE INVENTION

It is an object of the present invention to provide an exposure control device which eliminates the above-noted disadvantages peculiar to the prior art and which utilizes a light receiving element of rather slow response characteristic to effect high shutter speed control and utilizes reflected light from the surface of a film to effect slower shutter speed control.

According to the present invention, a light receiving element of slow response characteristic is disposed so as to receive the light passed through the picture-taking lens of a camera prior to picture-taking to thereby present a predetermined value of output and during the picture-taking, the response delay of said element is utilized to effect high shutter speed control and the reflected light from the film surface is received by said element or by a separate light receiving element provided in addition thereto to thereby effect slower shutter speed control.

The invention will become fully apparent from the following detailed description of some specific embodiments thereof taken in conjunction with the accompanying drawings.

DESCRIPTION OF THE PREFERRED EMBODIMENTS

Figure 1:
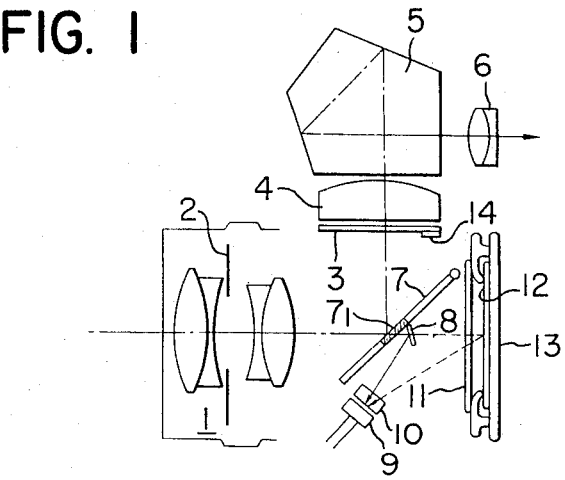
FIG. 1 is a schematic cross-sectional view of a single-lens reflex camera in which the exposure control device of the present invention has been applied.

Referring to FIG. 1, there is shown, in cross-sectional side view, a single-lens reflex camera which has incorporated therein the exposure control device according to the present invention. The camera includes a picture-taking lens 1 interchangeably mounted to the camera body, and an aperture or stop device 2 disposed in the lens 1 and operatively associated with a known preset mechanism incorporated in the barrel for the lens 1. Through an unshown automatic aperture driving mechanism of the camera, the aperture device 2 may be stopped down, during picture-taking, from its maximum $f$-value to an $f$-value which is preset by an aperture preset ring (not shown) provided on the picture-taking barrel. The preset mechanism and the automatic aperture driving mechanism are conventional in single-lens reflex cameras and need not be described herein. The camera further includes a focusing screen or glass 3, a condenser lens 4 provided above the focusing screen 3, a pentaprism 5, an eyepiece 6 and a quick return mirror 7. These constitute a known reflex viewfinder.

The mirror 7 has a half-mirror $7_1$ embedded centrally therein, and has a small mirror attached to the back side thereof. The mirror 8 may be a total reflection mirror or prism and serves to direct the light passed through the picture-taking lens toward a photoconductive light receiving element 9 such as CdS or CdSe cell. Numeral 10 designates light beam restricting means such as ND filter, stop or the like for ensuring a minimum variation in the quantity of light passed to the light receiving element 9 during picture-taking and during metering. Desirably, the light beam restricting means 10 should be designed so that the quantity of light passed therethrough may be varied in accordance with the $f$-value adjusted by an unshown preset ring. The camera further includes a shutter curtain 11, a photographic film 12 held against a film holder plate 13, and an exposure information indicator means such as diode or meter.

Figure 2:
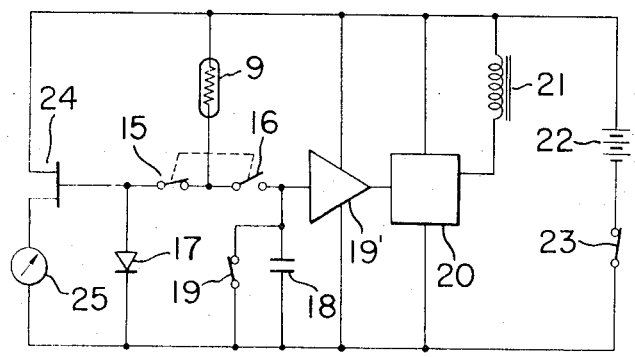
FIG. 2 is a diagrammatic representation of the electric shutter circuit in the camera of FIG. 1.

FIG. 2 diagrammatically shows an electric shutter circuit employed in the camera of FIG. 1. Switches 15 and 16 included in the circuit are changeable over in response to the reciprocal movement of the quick return mirror 7 in such a manner that the switch 15 closes and the switch 16 opens as shown in FIG. 2 when the mirror 7 assumes the position of FIG. 1 and that the switch 15 opens and the switch 16 closes when the mirror 7 is moved upwardly. A log diode 17 is serially connected with the light receiving element 9 through the switch 15, and a time limit capacitor 18 is serially connected with the light receiving element 9 through the switch 16. A switch contact 19 is parallel-connected with the capacitor 18 and adapted to be opened in response to the movement of the forward curtain of the shutter 11 and closed in response to the movement of the rearward curtain of the shutter, by an unshown mechanism. The circuit further includes an amplifier circuit 19', a switching circuit 20 connected with the output of the amplifier circuit, a rearward curtain holding magnet 21 connected with the output of the switching circuit, a power source 22 and a main switch 23. Numerals 24 and 25 designate a field effect transistor and a shutter speed indicator meter, respectively.

In the construction described above, the light receiving element 9 is disposed so that the light receiving surface thereof receives the reflected light from the mirror 8 and, during picture-taking, the reflected light from the surface of the film, and it is also positioned out of the optical path of the picture-taking lens so as not to intercept such optical path during picture-taking. The meter body is disposed so that the meter needle 25 is vibrated at the position of the information indicator means 14 on the focusing screen 3.

Operation of the above-described construction will now be described.

A. Opened Metering

The light beam restricting means 10 is moved toward the front of the light receiving surface of the light receiving element 9 in response to the preset of an aperture ring (not shown). As a result, the light passed through the then open aperture 2 in the lens system 1 and through the half-mirror 7₁ is reflected by the small mirror 8 and thence passed through the light beam restricting means 10 to the light receiving element 9, whose resistance value is thus reduced.

Figure 3:
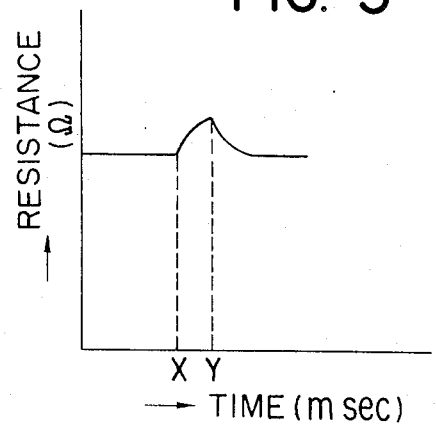
FIG. 3 is a graph illustrating the relationship between the resistance variation of the light receiving element and the opening-closing time of the shutter.

For a high shutter speed control to be effected, the mirror 7 is moved upwardly upon depression of a shutter button (not shown) and the aperture 2 is stopped down, and concurrently therewith, the light beam restricting means 10 is moved away from the front face of the light receiving element 9 and the forward shutter curtain 11 begins to move. In this case, the reflected light passed to the light receiving element 9 is decreased in quantity with the upward movement of the mirrors 7 and 8 and cut off momentarily, whereas the resistance value of the light receiving element 9 does not increase immediately but instead, as shown in FIG. 3, it increases gradually from the point of time X at which the mirror 7 begins to move up till the point of time Y at which the light to the light receiving element 9 is cut off (i.e. the time at which the forward shutter curtain 11 begins to move). The resistance value (or the current value) within such time delay in response operates the control circuit to move the shutter curtain 11 (rearward). In the meantime, the resistance value of the light receiving element 9 is increased gradually, but the variation in such resistance may be considered to be substantially zero within a very short time in a high shutter speed range. As a result, a great magnitude of charging current flows through the element 9 to the capacitor 18 at the beginning of the movement of the forward shutter curtain and a predetermined time thereafter, the switching circuit 20 is reversed to energize the magnet 21 to start the rearward shutter curtain 11. During that time, the resistance value of the light receiving element 9 remains substantially unchanged due to the response delay of the element.

On the other hand, as the forward curtain is moved, the reflected light from the surface of the film impinges upon the light receiving surface of the element 9, but such reflected light is negligibly small in amount because the rearward shutter curtain immediately begins to move to close the shutter. As a result, the opening-closing time of the shutter is determined solely by the light beam passed through the picture-taking lens which has been received by the light receiving element through the half-mirror 7₁ and mirror 8 prior to the picture-taking.

Where an object to be photographed has so low a brightness that the shutter speed is controlled to a low level, the shutter curtain 11 is fully opened temporally to increase the quantity of the reflected light from the film surface to the light receiving element 9 and the opening-closing time of the shutter is determined substantially by the reflected light from the film surface. In this case, the response delay of the light receiving element 9 appears as an error in the shutter time but such error is substantially eliminated because the controlled shutter time is long.

Where the shutter speed is to be controlled to an intermediate level, such control is accomplished by utilizing both the response delay of the light receiving element and the reflected light from the film surface, but the operation involved therein need not be described herein.

B. Stopped-down Metering

For the so-called stopped-down metering, that is, the metering effected with the aperture 2 stopped down to a predetermined f-value prior to a picture-taking operation, the light beam restricting means may be removed to thereby permit the same operation as that described above to take place under the stopped-down condition of the aperture.

Figure 4:
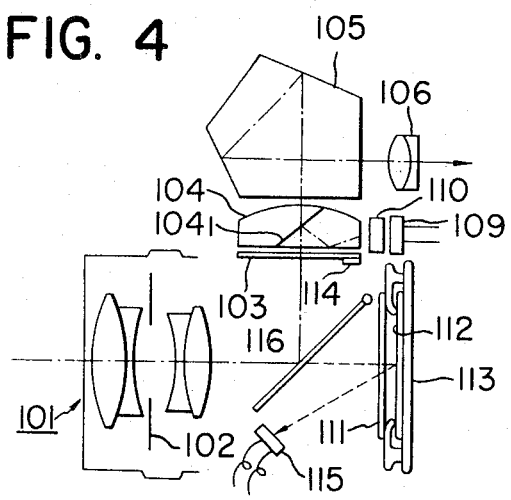
FIG. 4 is a view similar to FIG. 1 but showing a modified embodiment of the present invention.
Figure 5:
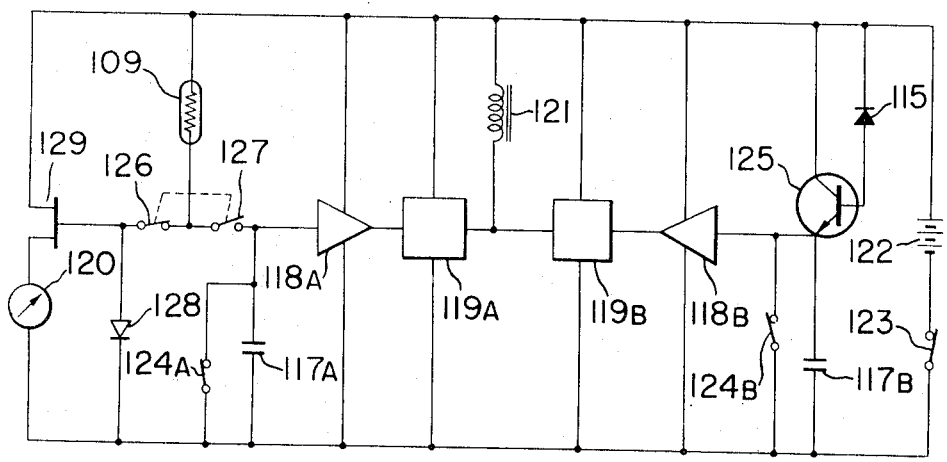
FIG. 5 is a diagrammatic respresentation of the electric shutter circuit in the embodiment of FIG. 4.

FIGS. 4 and 5 show a modification of the exposure control device according to the present invention. In FIG. 4, the parts corresponding to those shown in the embodiment of FIG. 1 are given similar numerals each prefixed with 100, such as 101, 102 and so on. The embodiment of FIG. 4 differs from that of FIG. 1 in that a condenser lens 104 is obliquely divided in the intermediate portion thereof and a half-mirror portion 104₁ is formed on the divider section and a light receiving element 109 similar to the element 9 of FIG. 1 having a slow response characteristic is disposed in opposed relationship with that side of the condenser lens 104 which is opposite to the half-mirror portion 104₁, so that prior to a picture-taking operation, the light passed through a picture-taking lens 101 and reflected from a mirror 116 is partly reflected by the half-mirror portion 104₁ so as to pass to the light receiving surface of the element 109 either directly or through internal total reflection in the condenser lens as indicated by a dot-and-dash line. A further difference of the present embodiment from the FIG. 1 embodiment is that another light receiving element 115 having a quicker response characteristic than that of the element 109, such as photodiode or photovoltaic cell of Se, Si or the like, is provided to receive the reflected light from the film surface only after the mirror 116 has been moved upwardly and the forward shutter curtain started.

FIG. 5 diagrammatically shows the shutter control circuit used in the device of FIG. 4. The circuit includes change-over switches 126 and 127 responsive to the upward movement of the mirror 116 to shift from their shown positions into open and closed positions, respectively, capacitors 117A and 117B cooperating with the photoconductive light receiving element 109 to form a time constant circuit, short-circuiting switches 124A and 124B adapted to open in response to movement of the forward shutter curtain and close in response to movement of the rearward shutter curtain, an amplifier circuit 118, switching circuits 119A and 119B, a transistor 125 having the base thereof connected with the photovoltaic cell 115, a magnet 121 for holding the rearward shutter curtain, a log diode 128, a shutter speed indicator meter 120 and a field effect transistor 129.

Operation of the above-described modified construction will now be described. Before picture-taking occurs, the light receiving element 109 receives the light passed through the picture-taking lens 101 via the mirror 116 and half-mirror portion $104_1$ so that the element 109 presents a resistance value corresponding to the brightness of the object to be photographed. In this case, the preset f-value controlled by an unshown preset ring provided for the lens 101 is taken into account. When the shutter release button (not shown) is depressed to move the mirror 116 upwardly, the switches 126 and 127 are changed over from their shown positions, the switch 127 being thus closed. At this stage, the rearward shutter curtain remains held by an unshown holder member. As the forward shutter curtain begins to move, the short-circuiting switches 124A and 124B are opened to charge the capacitors 117A and 117B. The light passed through the picture-taking lens to the light receiving element 109 is cut off with the upward movement of the mirror 116, but the element 109, whose response characteristic is slow, increases its resistance gradually as shown in FIG. 3. Where the object to be photographed has a high brightness and the shutter speed is controlled to a high level, the light receiving element 109 presents a very low resistance value and so, the capacitor 117A should be charged more quickly than the capacitor 117B to reverse the switching circuit 119A through the amplifier 118A. As a result, the magnet 121 is energized to attract the holder member which is holding the rearward shutter curtain, whereby this shutter curtain is released from the holder member and moved to complete an exposure cycle.

On the other hand, the light receiving element 115 is receiving the reflected light from the film surface, but the collector-emitter resistance presented by the transistor 125 as the result of the output current from the element 115 is sufficiently greater than the then resistance value of the light receiving element 109 so that the charging of the capacitor 117B is completed later than that of the capacitor 117A, thus preventing the magnet 121 from being energized by the switching circuit 119B. When the shutter opening-closing operation is completed with the mirror 116 returned to its normal position, the short-circuiting switches 117A and 117B are again closed and the switches 126 and 127 restore their positions as shown in FIG. 5.

Where the object to be photographed has a low brightness and the shutter speed is controlled to a slow level, the light receiving element 109 presents a great value of resistance during shutter release while the collector-emitter resistance of the transistor 125 is reduced through the light receiving element 115 by the filmreflected light resulting from the movement of the forward shutter curtain. As a result, the charging of the capacitor 117B progresses more quickly than that of the capacitor 117A to thereby reverse the switching circuit 119B to energize the magnet 121, which thus releases its hold on the rearward shutter curtain to permit the shutter opening-closing operation.

As will be appreciated from the foregoing, the present invention utilizes the response delay of the light receiving element to effect a high shutter speed control in accordance with the brightness of the object to be photographed, and utilizes the film-reflected light to effect an intermediate or a slower shutter speed control, and the change-over between these different shutter speed controls may be accomplished automatically, thus ensuring a proper value of exposure to be effectively provided for a wide variety of objects to be photographed.

It should be understood that the present invention is not restricted to the illustrated specific embodiments but various modifications may be made therein without departing from the scope of the invention as defined in the appended claims.

Further, in the embodiment of FIG. 5, the light receiving elements 10 and 115 are designed to control a common shutter-closing magnet by means of discrete control circuits, but it is also possible to connect these elements 109 and 115 in parallel relationship so as to enable the shutter-closing magnet to be energized by a common control circuit.

We claim:

1. An exposure control device in a singlelens reflex camera for metering light which has passed through the picture-taking lens of the camera to automatically effect a shutter speed control, said device comprising:

light receiving means disposed so as to receive, before release of the shutter, at least part of the light which has passed through the picture-taking lens and also to receive, after the release of the shutter, light reflected by a film surface, said means having a relatively slow response characteristic to permit high speed shutter control by utilizing said characteristic of said means, while also enabling low speed shutter control by the light reflected by the film surface;

optical means for directing at least part of the light which has passed through said picture-taking lens to said light receiving means, said optical means being movable out of the picture-taking optical path to interrupt, during picture-taking, the direction by said optical means to said light receiving means of said light which has passed through said picture-taking lens;

control means connected to said light receiving means to control the opening and closing of the shutter of the camera, said control means including:
  a time limit circuit electrically connected with said light receiving means;
  a switching circuit connected with said time limit circuit; and
  actuator means for closing the shutter connected with said switching circuit and adapted to actuate the shutter to close in response to reversal of said switching circuit.

2. An exposure control device according to claim 1, wherein said light receiving means is of the photoconductive type.

3. An exposure control device according to claim 1, wherein said optical means is a quick return mirror comprising a half-mirror portion and a total reflection mirror, and said light receiving means has the light receiving surface thereof disposed on the optical axes of said two mirrors.

4. An exposure control device according to claim 1, wherein said picture-taking lens has a preset aperture device therein, and said light receiving means comprises a light receiving element and light beam restricting means which is operatively associated with said preset aperture device of said picture-taking lens to restrict the quantity of light passed therethrough.

5. An exposure control device according to claim 1 wherein said light receiving element is used for indicating information on exposure prior to phototaking.

6. An exposure control device according to claim 1 further comprising:
  electric means for indicating information on exposure prior to phototaking, and
  switching means for electrically connecting said light receiving element with said indicating means, said light receiving means being utilized also for the indication.

7. An exposure control device in a singlelens reflex camera for metering light which has passed through the picture-taking lens of the camera to automatically effect a shutter speed control, said device comprising:
  first light receiving means for receiving light reflected by the surface of a film;
  second light receiving means for receiving at least part of the light which has passed through the picturetaking lens, said second light receiving means having a slow response characteristic;
  said first light receiving means being used mainly for low speed shutter control and said second light receiving means being used mainly for high speed shutter control;
  optical means movable to prevent light from passing to said second light receiving means during picturetaking, said optical means being moved to its lightintercepting position in response to a shutter release operation prior to the opening of the shutter and returned to its non-intercepting position after the closing of the shutter;
  control means connected to said first and second light receiving means to control the opening and the closing of the shutter, said control means being operated by the output of one of said two light receiving means to close the shutter.

8. An exposure control device according to claim 7, wherein said first light receiving means is a light receiving element of the photoelectromotive type and said second light receiving means is a light receiving element of the photoconductive type.

9. An exposure control device according to claim 8 wherein said control means comprises capacitors respectively arranged to be charged by the outputs of said two light receiving means and is so constituted as to control the closing time of the shutter by whichever of said capacitors charges the more rapidly.

10. An exposure control device according to claim 9, wherein said control means includes first and second switching circuit means and electromagnetic means connected so as to be responsive to the switching circuit means, said electromagnetic means being arranged to be actuated after operation of the shutter to control the closing operation of the shutter, and said switching circuit means having their inputs respectively connected to said capacitors.

11. An exposure control device according to claim 7, wherein said optical means is a quick return mirror.

12. An exposure control device according to claim 2, wherein said second light receiving means is disposed at a position adjacent a focusing screen and conjugate with the surface of the film.

13. An exposure control device according to claim 7, further comprising exposure value indicating means electrically connected to said second light receiving means, said indicating means including indicator means and amplifier means the input of which is connected to said second light receiving means.

14. An exposure control device according to claim 13, wherein said amplifier means comprises a field effect transistor (FET).

* * * * *